United States Patent [19]

Sato et al.

[11] Patent Number: 4,906,063
[45] Date of Patent: Mar. 6, 1990

[54] WAVE GUIDE TYPE OPTICAL DEVICE AND METHOD OF FABRICATING THE SAME

[75] Inventors: Hidemi Sato, Yokohama; Yasuo Hira, Kanagawa; Shigeru Sasaki, Kamakura; Atsuko Fukusima, Yokohama; Kazumi Kawamoto, Yokohama, all of Japan

[73] Assignee: Hitachi, Ltd., Tokyo, Japan

[21] Appl. No.: 150,204

[22] Filed: Jan. 29, 1988

[30] Foreign Application Priority Data

Feb. 5, 1987 [JP] Japan .................................. 62-23607

[51] Int. Cl.$^4$ ................................................ G02B 6/10
[52] U.S. Cl. .................................................. 350/96.13
[58] Field of Search ................ 350/96.12, 96.13, 96.14

[56] References Cited

FOREIGN PATENT DOCUMENTS 165122 12/1981 Japan ................................. 350/96.13

Primary Examiner—William L. Sikes
Assistant Examiner—Robert E. Wise
Attorney, Agent, or Firm—Antonelli, Terry & Wands

[57] ABSTRACT

This invention relates to a wave guide type optical device as an integrated optical device having formed thereon lens and grating having particularly high efficiency and a fabrication method thereof. The present invention is characterized in that a wave guide type optical device having high efficiency and high stability can be fabricated efficiently by forming a buffer layer made of a dielectric substance on a optical wave guide formed near the surface of a substrate having an acousto-optic effect, then forming a light wave control loading layer and finely working the loading layer and the buffer layer to a predetermined shape of a desired optical device.

16 Claims, 2 Drawing Sheets

FIG. 1
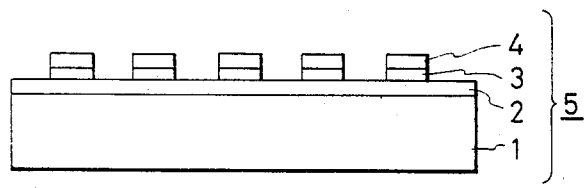
FIG. 2a
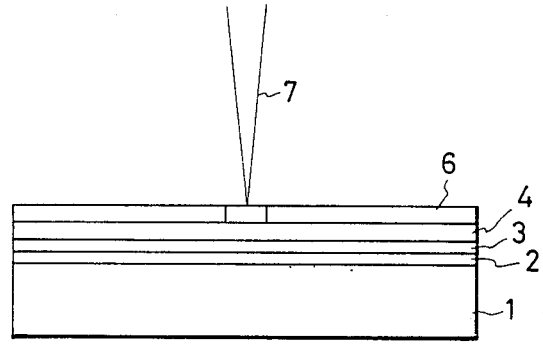
FIG. 2b
FIG. 2c
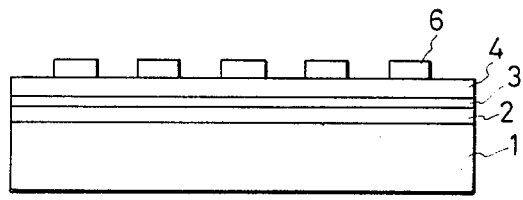
FIG. 3
PRIOR ART
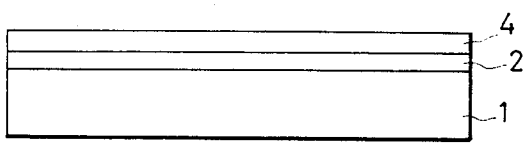

4,906,063

WAVE GUIDE TYPE OPTICAL DEVICE AND METHOD OF FABRICATING THE SAME

BACKGROUND OF THE INVENTION

This invention relates to a wave guide type optical device as an optical integrated circuit having formed thereon lenses and gratings having particularly high efficiency, and to fabrication method thereof.

Optical components for use in the fields of optical communication systems and for optical data processing have been constituted conventional by combining mechanically bulk components such as lenses, prisms and gratings. Therefore, the optical components of this kind have a large outer dimension and cannot meet with demands for miniaturization. Moreover, the cost of production is high and since they are assembled by mechanical combination, stability as well as reliability drop in the course of extended period of time. For this reason, the concept of optical IC has been introduced recently. According to this concept, a plurality of elements are integrated on one substrate, and drastic reduction of the size and cost of production of optical components has been examined. In other words, light emission/reception elements and wave guide type (thin film type) lenses and gratings are integrated on one substrate to constitute an optical component.

To form the optical devices such as the wave guide type lenses and grating of the type described above, two means have been employed to date. As described, for example, in Japanese Patent Laid-Open No. 113903/1983, the first means employs ion implantation, thermal diffusion, proton exchange or other techniques and forms a region having a higher refractive index than that of a light guide path. As discussed in R. Ulrich et al., "Geometrical Optics in Thin Film Light Guides; Applied Optics", 10, 9(1971), the second means forms a loading layer having a different refractive index on an optical wave guide.

With reference to the prior art technique described above, the first means involves the problem that since the region having a different refractive index is formed by diffusion or ion implantation, the distribution of refractive index cannot be controlled easily, thermal stability is low and efficiency of light wave is low. The second means is not considered sufficiently the difference of thermal and mechanical characteristics between the optical wave guide path and the optical wave control layer formed on the former. When the loading layer is formed directly on the optical wave guide, therefore, internal stress develops inside the film due to the difference of properties at the time of film formation and crack and peel of the control layer develop.

SUMMARY OF THE INVENTION

It is therefore a primary object the present invention to produce efficiently a wave guide type optical device having high control efficiency of optical wave and high stability while controlling the distribution of refractive indexes with a high level of accuracy and eliminating drawbacks such as crack and peel.

In order to accomplish the object described above, the present invention provides a wave guide type optical device having high efficiency of light wave and high stability and fabrication method thereof which comprises forming a buffer layer made of a dielectric on an optical wave guide path which is formed near the surface of a substrate having electro-optic or acousto-optic effects, then forming a light wave control loading layer, and working finely the loading layer and the buffer layer in a predetermined shape of an optical device. Thus, the present invention can fabricate the wave guide type optical device efficiently.

BRIEF DESCRIPTION OF THE DRAWINGS

FIG. 1 is a front view showing a wave guide type optical device in accordance with the first embodiment of the present invention;

FIGS. 2a, 2b, and 2c are front views each showing a fabrication step of the optical device;

FIG. 3 is a front view of a conventional wave guide type optical device illustrated as a comparative example;

DESCRIPTION OF THE PREFERRED EMBODIMENTS

Figure 4:
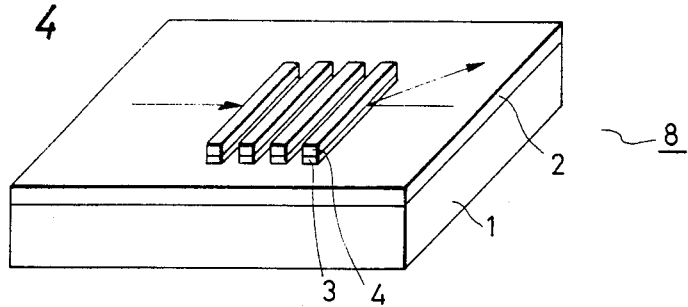
FIG. 4 is a perspective view of a wave guide type grating in accordance with the second embodiment of the present invention.

The present invention uses crystalline materials such as $LiNbO_3$, $LiTaO_3$, ZnO, ZnS, CdS, ZnTe, GaAs, GaP, $TeO_2$, and YIG or amorphous materials such as $As_2S_3$ and $As_2Se_3$ for the substrate of the wave guide type optical device. All of these materials have an electrooptic effect or an acoustooptic effect. Accordingly, in the case of the former, it is possible to control a guided light beam due to the Pockel's effect according to which the change in refractive index is proportional to an impressed electric field or due to the Kerr's effect according to which the change in refractive index is proportional to the square of the electric field. In the case of the latter, on the other hand, optical wave control such as optical deflection can be made due to photo-elasticity utilizing a surface elastic wave as an acoustic wave.

Here, the construction of the present invention will be described schematically. The optical wave guide to be formed near the surface of the substrate employs two- or three-dimensional growing means for a wave guide diffusion source such as GaAs, ZnO, Cd, Se, Ti, or the like, by diffusion, ion implantation or proton exchange. Next, the buffer layer is formed on the optical wave guide. This buffer layer is composed of silica type glass such as quartz glass, Pyrex glass, crown glass, or the like and its coefficient of thermal expansion is in between those of the optical wave guide and the loading layer. Known arbitrary thin film formation technique such as electron beam vacuum deposition or sputtering can be used as means for forming the buffer layer. Among the thin film formation technique, particularly preferred is sputtering because the film formation operation is simple. The sputtering conditions are a substrate temperature of from 20° to 350° C., a sputtering gas (Ar) pressure of from $1.0 \times 10^{-3}$ to $2.0 \times 10^{-2}$ mmHg, power of from 300 to 900 W and film thickness of from 10 to 500 Å.

The optical wave control loading layer to be formed on the buffer layer has preferably a large difference of refractive index with the optical wave guide path in order to improve optical wave control efficiency. Therefore, TiO$_2$, Si$_3$N$_4$, GaAs or GaP is used as the loading layer. Among them, particularly preferred is TiO$_2$ because it has a high refractive index and high stability. Sputtering is used as the film formation technique of TiO$_2$ in the same way as in the case of the silica type glass described above. This TiO$_2$ film is from 200 to 1,500 Å thick.

Since the buffer layer is sandwiched between the loading layer and the light guide layer as described above, it is possible to reduce the internal stress occurring inside the loading layer and to prevent defects such as crack and peel.

Since the buffer layer is sandwiched, furthermore, the refractive index of the loading layer as a whole can be controlled arbitrarily by the refractive index and thickness of the buffer layer. In other words, the effective refractive index of the loading layer can be calculated by determining the area ratio of the loading layer and the buffer layer from the distribution of electric field at the time of propagation of light wave.

Next, the loading layer and buffer layer described above are finely worked by ordinary lithography and dry etching techniques in the shape of a predetermined wave guide type optical device. These techniques enable fine work of the device with a high level of accuracy of sub-microns.

Next, preferred embodiments of the present invention will be described further in detail with reference to the accompanying drawings.

Figure 5:
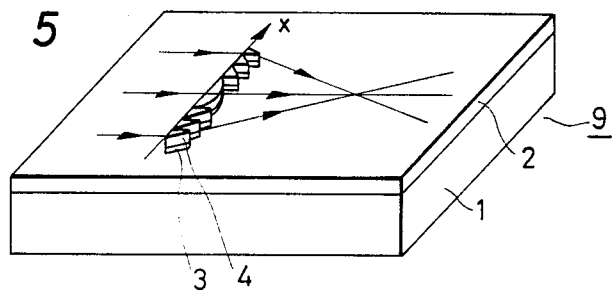
FIG. 5 is a perspective view showing a light wave guide type lens in accordance with the third embodiment of the present invention.
Figure 6:
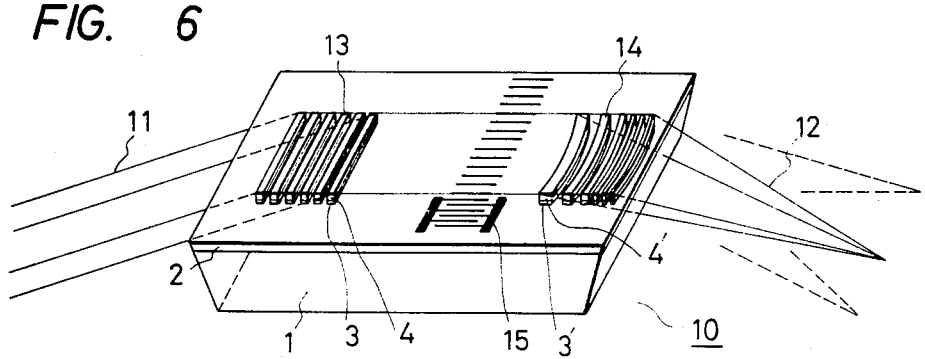
FIG. 6 is a perspective view showing a light guide type optical deflector in accordance with the fourth embodiment of the present invention.

FIG. 1 is a front view of the wave guide type optical device in accordance with the first embodiment of the present invention; FIGS. 2a, 2b and 2c are front views each showing the fabrication step of the first embodiment; FIG. 3 is a front view of a conventional wave guide type optical device as a comparative example; FIG. 4 is a perspective view of a wave guide type grating in accordance with the second embodiment of the present invention; FIG. 5 is a perspective view of a wave guide type lens in accordance with the third embodiment of the present invention; and FIG. 6 is a perspective view of a wave guide type optical deflector in accordance with the fourth embodiment of the present invention.

In FIG. 1, an optically polished LiNbO$_3$ crystal is used for a substrate 1, and Ti is deposited in a thickness of 250 Å on the substrate 1 by sputtering and subjected to thermal diffusion to form an optical wave guide 2. Sputtering is carried out at RF power of 100 W, an Ar gas pressure of $3 \times 10^{-3}$ mmHg and a sputtering rate of 4 Å/sec, while thermal diffusion is carried out by heat treatment at 1,000° C. inside an electric furnace, for 3 hours in an Ar gas atmosphere and then for 1 hour in an O$_2$ gas atmosphere. A buffer layer 3 to be formed on the optical wave guide 2 is 100 Å thick and is formed by sputtering Corning 7059 glass. The film formation conditions are RF power of 100 W, and Ar gas pressure of $3 \times 10^{-3}$ mmHg and a sputtering rate of 2 Å/sec. A loading layer 4 to be formed on the buffer layer 3 is 0.1 μm thick and formed by sputtering TiO$_2$ in the same way as described above. As the formation condition, metallic Ti is used as the target, RF power is 500 W, O$_2$ and Ar are used as sputtering gas with the gas composition (O$_2$/Ar) being 0.7, a gas pressure is $5.50 \times 10^{-3}$ mmHg and a sputter rate is 1 Å/sec.

Next, FIG. 2 shows the lithography and etching steps in order to finely work the loading layer 4 and the buffer layer 3 to a predetermined shape of a wave guide type optical device. As shown in FIG. 2a, a resist 6 is formed on the loading layer 4 by spin coating. Here, chloromethylated polystyrene ("CMS-EXR", made by Toyo Soda Co., Ltd.) as an electron ray resist is used as the resist 6 and it is 0.5 μm thick. After the resist 6 is pre-baked at 130° C. for 20 minutes, the electron beam 7 is radiated to a predetermined shape of the loading layer. The beam irradiation conditions are an electron beam diameter of 0.1 μm and an irradiation amount of 16 μC/cm$^2$. After the exposure of the electron beam, development is carried out to prepare a mask 6 made of the resist as shown in FIG. 2b.

Thereafter, the loading layer 4 and the buffer layer 3 are finely worked by ion etching. This ion etching is carried out by use of CF$_4$ as the etching gas, at a pressure of $3.8 \times 10^{-2}$ mmHg and RF power of 200 W for 15 minutes. After etching is conducted as shown in FIG. 2c, the resist mask 6 is removed and the wave guide type optical device 5 shown in FIG. 1 can thus be fabricated.

The following illustrate a comparative example to the first embodiment of the invention described above. Namely, a LiNbO$_3$ crystal is used for the substrate 1 and the optical wave guide 2 is formed by thermal diffusion of Ti as shown in FIG. 3. The formation conditions are the same as those of the first embodiment. Next, the loading layer 4 is formed directly on the optical wave guide 2 by sputtering under the same condition as in the first embodiment. As a result, crack and peel occur on the loading layer 4 and the wave guide type optical device cannot be fabricated.

FIG. 4 is a schematic perspective view of a wave guide type grating formed as the optical device in accordance with the second embodiment of the present invention. The LiNbO$_3$ crystal is used for the substrate 1 in the same way as i the first embodiment and the optical wave guide path 2 is formed by thermal diffusion of Ti. Next, the buffer layer 3 made of glass and the loading layer 4 made of TiO$_2$ are formed by sputtering and then coating of photoresist, exposure, development and ion etching are carried out for the loading layer 4 and the buffer layer 3 in the same way as in the first embodiment so as to form a Bragg's grating having a grating period of 1 um, a grating width of 1 mm and a number of gratings of 100. There is thus fabricated a wave guide type grating 8.

In order to confirm the characteristics of the wave guide type grating 8, He-Ne laser beam (wavelength=633 nm) is guided to the Ti diffused LiNbO$_3$ optical wave guide 2 by the prism coupler method and are allowed to be incident to the loading layer 4 at a Bragg's angle.

As a result, a satisfactorily good result of diffraction efficiency of 70% can be obtained. When the change in diffraction efficiency is measured by leaving the wave guide type grating standing at 150° C. for 500 hours, the change is found to be up to 1%.

FIG. 5 shows a wave guide type lens 9 formed as the optical device in accordance with the third embodiment of the present invention. The substrate 1 is composed of the LiNbO$_3$ crystal in the same way as in the first embodiment, and the optical wave guide path 2 is formed by thermal diffusion of Ti. The buffer layer 3 made of glass and the loading layer 4 made of TiO$_2$ are then formed by sputtering. Next, coating of photoresist, exposure, development and ion etching are carried out for the loading layer 4 and the buffer layer 3 in such a manner as to satisfy the following formula (1) as the distribution formula of lens thickness, in the same way as in the first embodiment:

$$T(x) = T_{max} [\phi_x/2\pi + 1] \quad (1)$$

$$\phi_x = -(k_0 n/2f) x^2 + 2m\pi \quad (2)$$

$$T_{max} = 2\pi/k_0 \Delta n \quad (3)$$

$$k_0 = 2\pi/\lambda \quad (4)$$

where $n$: effective refractive index of optical wave guide
$f$: focal length
$\Delta n$: difference of refractive index between optical wave guide path and loading layer
$\lambda$: wavelength
$m = 0, 1, 2, \ldots$ When the He-Ne laser beam is allowed to be incident to the wave guide type lens 9 described above in order to confirm the characteristics of the lens 9, good lens characteristics having condensation efficiency of 70% can be obtained. Moreover, the change in condensation efficiency remains below 2% as a result of high temperature tests at 150° C. for 500 hours.

FIG. 6 shows a wave guide type optical deflector 10 formed as the optical device in accordance with the fourth embodiment of the present invention. In the same way as in the first embodiment, the substrate 1 is composed of the LiNbO₃ crystal and the optical wave guide 2 is formed by thermal diffusion of Ti. The buffer layer 3 made of glass and the loading layer 4 made of TiO₂ are formed by sputtering. Coating of photoresist, exposure, development and ion etching are carried out in the same way as in the first embodiment so that the loading layer 4 and the buffer layer 3 serve as an input grating coupler 13 and a focusing grating coupler 14, respectively. Here, the input grating coupler 13 is to guide the incident beam 11 to the optical wave guide path 2, and its grating period is 3 um while the grating dimension is 3×3 mm. On the other hand, the focusing grating coupler 14 has the function of emitting outward the guided beam propagating through the optical wave guide path 2 and focusing it to a point in free space. The grating period is 3 um at the center and it consists of a group of curves having unequal period between them. The aperture is 2×2 mm and the focal length is 50 mm. Next, a transducer (IDT; Inter Digital Transducer) 15 is formed on the surface of the optical wave guide path 2 in order to excite SAW (Surface Acoustic Wave). It is formed by vacuum deposition of an Al pattern by lift-off method. The transducer 15 has a center wavelength of 14 um, center frequency of 250 MHz and finger pair of 2.

In order to confirm the characteristics of the wave guide type optical deflector 10 described above, the He-Ne laser beam is allowed to be incident to the input grating coupler 13 and to leave the focusing grating coupler 14. As a result, the focus spot diameter is 20 um with respect to the diffraction limit value of 14 μm and efficiency is as high as 40%. When RF power is supplied to the transducer 15 and optical deflection test is conducted by using the resulting SAW, the guided beam undergoes Bragg diffraction due to SAW and diffracted beam can be obtained at ±10 mrad which is a predetermined deflection angle. Diffraction efficiency is 80% in this case, and it is confirmed that no remarkable degradation occurs as to the spot diameter.

In a wave guide type optical device of the type wherein an optical wave control loading layer is disposed on an optical wave guide formed near the surface of a substrate having an electro-optic or acousto-optic effect, the wave guide type optical device and its fabrication method in accordance with the present invention form the buffer layer made of a dielectric substance between the optical wave guide path and the loading layer. Accordingly, the present invention can fabricate efficiently various wave guide type optical devices such as optical deflectors, optical pickups, and the like, having less defect such as crack and peel but higher light efficiency and higher thermal stability than the conventional optical devices, and is effective in forming optical integrated circuits.

What is claimed is:

1. A wave guide type optical device comprising a dielectric light wave control loading layer disposed on an optical wave guide formed near the surface of a substrate having an acoustooptic effect, and a buffer layer made of a dielectric formed between said optical wave guide and said loading layer.

2. A wave guide type optical device according to claim 1, wherein the refractive index of said loading layer is controlled arbitrarily by disposing said buffer layer between said optical wave guide and said loading layer.

3. A wave guide type optical device according to claim 1, wherein the coefficient of thermal expansion of said buffer layer is in between the coefficients of thermal expansion of said optical wave guide and said loading layer.

4. A wave guide type optical device according to claim 1, wherein a Bragg grating is formed on said optical wave guide as an optical device for controlling a guided beam.

5. A wave guide type optical device according to claim 1, wherein a wave guide type lens is formed on said optical wave guide as an optical device for controlling a guided beam.

6. A wave guide type optical device according to claim 1, which includes a grating coupler of an input-/output type and a surface acoustic wave generation electrode for deflecting a guided beam formed on said optical wave guide.

7. A wave guide type optical device according to claim 1, wherein a surface acoustic wave is used as deflection means of a guided beam, the guided beam is emitted into space and converged to one point by a focusing grating coupler of an output type formed on said optical wave guide.

8. A wave guide type optical device according to claim 1, wherein said substrate is LiNbO₃, said loading layer is TiO₂ and said buffer layer is Corning 7059 glass or SiO₂.

9. A wave guide type optical device according to claim 1, wherein said buffer layer is from 10 to 500 Å thick.

10. A wave guide type optical device according to claim 1, wherein said loading layer is TiO₂ from 200 to 1,500 Å thick.

11. A wave guide type optical device according to claim 1, wherein said buffer layer is a silica type glass.

12. A wave guide type optical device according to claim 1, wherein said substrate is LiNbO₃.

13. A wave guide type optical device according to claim 1, wherein said substrate is LiTaO₃.

14. A wave guide type optical device according to claim 1, wherein said substrate is ZnO.

15. A wave guide type optical device according to claim 1, wherein said dielectric light wave control loading layer is TiO$_2$.

16. A method of forming a wave guide type optical device having a dielectric light wave control loading layer on an optical wave guide path formed near the surface of a substrate having an acoustooptical effect comprising the steps of:

forming an optical wave guide near the surface of said substrate;

forming a buffer layer made of a dielectric on said optical wave guide;

forming a dielectric light wave control loading layer on said buffer layer; and working said buffer layer and said loading layer into a predetermined optical wave control device.

* * * * *